United States Patent
Liedtke et al.

(10) Patent No.: US 11,676,503 B2
(45) Date of Patent: Jun. 13, 2023

(54) SYSTEMS AND METHODS FOR PREDICTIVE MODELLING OF DIGITAL ASSESSMENT PERFORMANCE

(71) Applicant: Pearson Education, Inc., Bloomington, MN (US)

(72) Inventors: Mark E. Liedtke, Castle Rock, CO (US); Sumona J. Routh, Arvada, CO (US); Clayton Tong, Parker, CO (US); Daniel L. Ensign, Fort Lupton, CO (US); Victoria Kortan, Centennial, CO (US); Srirama Kolla, Highlands Ranch, CO (US)

(73) Assignee: PEARSON EDUCATION, INC., Bloomington, MN (US)

( * ) Notice: Subject to any disclaimer, the term of this patent is extended or adjusted under 35 U.S.C. 154(b) by 675 days.

(21) Appl. No.: 16/786,020

(22) Filed: Feb. 10, 2020

(65) Prior Publication Data
US 2020/0257995 A1  Aug. 13, 2020

Related U.S. Application Data

(60) Provisional application No. 62/802,931, filed on Feb. 8, 2019.

(51) Int. Cl.
*G06N 20/00* (2019.01)
*G09B 7/00* (2006.01)
(Continued)

(52) U.S. Cl.
CPC .............. *G09B 7/02* (2013.01); *G06F 16/156* (2019.01); *G06F 18/2321* (2023.01); *G06N 5/04* (2013.01);
(Continued)

(58) Field of Classification Search
CPC ............. G09B 7/00; G06N 20/00; G06N 3/08
See application file for complete search history.

(56) References Cited

U.S. PATENT DOCUMENTS 10,027,689 B1   7/2018 Rathor et al.
10,237,294 B1   3/2019 Zadeh et al.
(Continued)

FOREIGN PATENT DOCUMENTS

JP   2017097139   6/2017

OTHER PUBLICATIONS

Y. Lee, "Estimating student ability and problem difficulty using item response theory (IRT) and TrueSkill", Feb. 7, 2019, Information Discovery and Delivery, pp. 67-75, https://doi.org/10.1108/IDD-08-2018-0030 (Year: 2019).

*Primary Examiner* — James S. McClellan
(74) *Attorney, Agent, or Firm* — Quarles & Brady LLP

(57) ABSTRACT

Systems and methods are provided by which a machine learning model may be executed to determine the probability that a given user will respond correctly to a given assessment item of a digital assessment on their first attempt. The machine learning model may process feature data corresponding to the user and the assessment item in order to determine the probability. The feature data may be calculated periodically and/or in real time or near-real time according to a machine learning model definition based on assessment data corresponding to the user's activity and/or based on responses submitted by all users to the assessment item and/or to content related to the assessment item.

20 Claims, 9 Drawing Sheets

(51) Int. Cl.
  *G09B 7/02* (2006.01)
  *G06N 5/04* (2023.01)
  *G06N 20/20* (2019.01)
  *G09B 7/06* (2006.01)
  *G06F 16/14* (2019.01)
  *G06F 18/2321* (2023.01)

(52) U.S. Cl.
  CPC ............ *G06N 20/00* (2019.01); *G06N 20/20* (2019.01); *G09B 7/00* (2013.01); *G09B 7/06* (2013.01)

(56) References Cited

U.S. PATENT DOCUMENTS

| | | | |
|---|---|---|---|
| 10,424,217 | B1 | 9/2019 | Sheehan |
| 10,453,165 | B1 | 10/2019 | Kostov |
| 11,443,647 | B2 | 9/2022 | Liedtke et al. |
| 2003/0129574 | A1* | 7/2003 | Ferriol .................... G09B 5/00 434/323 |
| 2014/0038155 | A1 | 2/2014 | Weitzman |
| 2014/0272905 | A1 | 9/2014 | Boersma |
| 2015/0006454 | A1 | 1/2015 | Supanc et al. |
| 2016/0217701 | A1* | 7/2016 | Brown .................... G09B 7/00 |
| 2016/0314699 | A1 | 10/2016 | Brinton et al. |
| 2017/0154539 | A1 | 6/2017 | King et al. |
| 2017/0323211 | A1* | 11/2017 | Bencke ................... G06Q 10/00 |
| 2017/0372215 | A1 | 12/2017 | Platt et al. |
| 2018/0211554 | A1 | 7/2018 | Corbin, II et al. |
| 2018/0357915 | A1* | 12/2018 | Harlow ................... G06N 5/04 |
| 2019/0197369 | A1 | 6/2019 | Law et al. |
| 2020/0193317 | A1 | 6/2020 | Cha et al. |
| 2020/0202226 | A1 | 6/2020 | Nagatani et al. |
| 2022/0050897 | A1 | 2/2022 | Gaddam et al. |

\* cited by examiner

US 11,676,503 B2

SYSTEMS AND METHODS FOR PREDICTIVE MODELLING OF DIGITAL ASSESSMENT PERFORMANCE

CROSS-REFERENCE TO RELATED APPLICATIONS

This application claims the benefit of priority from provisional application No. 62/802,931, titled SYSTEMS AND METHODS FOR PREDICTIVE MODELLING OF DIGITAL ASSESSMENTS, filed Feb. 8, 2019, the entire contents of which is incorporated herein by reference.

FIELD OF THE INVENTION

This disclosure relates to the field of systems and methods for evaluating the probability that a user will respond correctly to an assessment item of a digital assessment on their first attempt. Applications of this evaluation may include automatically giving credit for assessment items with a high correct first attempt probability.

BACKGROUND OF THE INVENTION

A computer network or data network is a telecommunications network which allows computers to exchange data. In computer networks, networked computing devices exchange data with each other along network links (data connections). The connections between nodes are established using either cable media or wireless media.

Network computer devices that originate, route and terminate the data are called network nodes. Nodes can include hosts such as personal computers, phones, servers as well as networking hardware. Two such devices can be said to be networked together when one device is able to exchange information with the other device, whether or not they have a direct connection to each other.

Computer networks differ in the transmission media used to carry their signals, the communications protocols to organize network traffic, the network's size, topology and organizational intent. In most cases, communications protocols are layered on other more specific or more general communications protocols, except for the physical layer that directly deals with the transmission media.

Conventional electronic learning (i.e., e-learning) systems may provide content and assessments to students, but may lack the ability to predict the future performance of a student based on their previous interactions with the systems.

SUMMARY OF THE INVENTION

The present invention provides systems and methods for the evaluation of the probability that a user will respond correctly to an assessment item of a digital assessment on their first attempt.

In an example embodiment, a system may include a computer processor, an electronic communication network, the computer processor being in electronic communication with an external server via the electronic communication network, and a computer memory in electronic communication with the computer processor and configured to store computer-readable instructions which, when executed, cause the computer processor to receive, with a first service, a request from the external server, the request including a user identifier corresponding to a user, an assessment item identifier corresponding to an assessment item of a digital assessment, and request data associated with a machine learning model, execute, with a second service, the machine learning model to process feature data to determine a correct first attempt probability for the user for the assessment item. The feature data may include a plurality of user correct first attempt rates corresponding to a first plurality of grades of a first plurality of responses previously submitted by the user, and a plurality of global correct first attempt rates corresponding to a second plurality of grades of a second plurality of responses previously submitted by a plurality of users.

In some embodiments, the computer-readable instructions, when executed, may cause the computer processor to calculate the plurality of user correct first attempt rates based on at least one of a first average grade corresponding to first responses submitted by the user to a first group of assessment items corresponding to a first hierarchical content level that includes the assessment item or a second average grade corresponding to a predefined number of second responses most recently submitted by the user.

In some embodiments, the computer-readable instructions, when executed, may cause the computer processor to calculate the plurality of global correct first attempt rates based on at least one of a third average grade corresponding to third responses submitted by the plurality of users to the first group of assessment items, a fourth average grade corresponding to fourth responses submitted by the plurality of users to a second group of assessment items corresponding to a second hierarchical content level that includes the assessment item, or a fifth average grade corresponding to fifth responses submitted by the plurality of users to the assessment item.

In some embodiments, the plurality of user correct first attempt rates may be calculated based on each of the first average grade and the second average grade.

In some embodiments, the plurality of global correct first attempt rates may be calculated based on each of the third average grade, the fourth average grade, and the fifth average grade.

In some embodiments, the first responses and the second responses may correspond to first attempts by the user, and wherein the third responses, fourth responses, and fifth responses correspond to first attempts by the plurality of users.

In some embodiments, the computer-readable instructions, when executed, may cause the computer processor to determine, with a prediction evaluator, that the correct first attempt probability exceeds a predetermined threshold.

In some embodiments, the computer-readable instructions, when executed, may cause the computer processor to, upon determining that the correct first attempt probability exceeds the predetermined threshold, send, with the first service, a recommendation to the external server indicating that credit for the assessment item should be automatically given to the user without requiring the user to submit a response to the assessment item.

In an example embodiment, a system may include at least one computer processor and at least one computer memory in electronic communication with the at least one computer processor and configured to store computer-readable instructions which, when executed, cause the at least one computer processor to receive a request from an external server that is in electronic communication with the at least one computer processor, the request identifying a user and an assessment item corresponding to a digital assessment, and process feature data with a machine learning model to determine a correct first attempt probability for the user for the assessment item. The feature data may include a plurality of user correct first attempt rates corresponding to first activity of the user, a plurality of global correct first attempt rates corresponding to second activity of a plurality of users.

In some embodiments, the computer-readable instructions, when executed, may cause the at least one computer processor to calculate the plurality of user correct first attempt rates based on at least one of a first average grade corresponding to a first group of first attempt responses submitted by the user to a first group of assessment items corresponding to a first hierarchical content level that includes the assessment item or a second average grade corresponding to a second group of first attempt responses most recently submitted by the user, wherein the second group of first attempt responses includes a predefined number of responses.

In some embodiments, the computer-readable instructions, when executed, may cause the at least one computer processor to calculate the plurality of global correct first attempt rates based on one or more of a third average grade corresponding to a third group of first attempt responses submitted by the plurality of users to the first group of assessment items, a fourth average grade corresponding to a fourth group of first attempt responses submitted by the plurality of users to a third group of assessment items corresponding to a second hierarchical content level that includes the assessment item, or a fifth average grade corresponding to a fifth group of first attempt responses submitted by the plurality of users to the assessment item.

In some embodiments, the plurality of user correct first attempt rates may be calculated based on each of the first average grade and the second average grade.

In some embodiments, the plurality of global correct first attempt rates may be calculated based on each of the third average grade, the fourth average grade, and the fifth average grade.

In some embodiments, the computer-readable instructions, when executed, may cause the at least one computer processor to determine, with a prediction evaluator, that the correct first attempt probability exceeds a predetermined threshold, and, upon determining that the correct first attempt probability exceeds the predetermined threshold, send a recommendation to the external server indicating that credit for the assessment item should be automatically given to the user without requiring the user to submit a response to the assessment item.

In an example embodiment, a method may include steps of receiving, with at least one computer processor from an external server, a request identifying a user and an assessment item corresponding to a digital assessment, and processing, with the at least one computer processor, feature data with a machine learning model to determine a correct first attempt probability for the user for the assessment item, the feature data comprising a plurality of user correct first attempt rates corresponding to first activity of the user, and a plurality of global correct first attempt rates corresponding to second activity of a plurality of users.

In some embodiments, the method may include steps of calculating, with the at least one computer processor, the plurality of user correct first attempt rates by calculating a first average grade corresponding to first responses submitted by the user to a first group of assessment items corresponding to a first hierarchical content level that includes the assessment item, and calculating a second average grade corresponding to a predefined number of second responses most recently submitted by the user.

In some embodiments, the method may include steps of calculating, with the at least one computer processor, the plurality of global correct first attempt rates by calculating a third average grade corresponding to third responses submitted by the plurality of users to the first group of assessment items, calculating a fourth average grade corresponding to fourth responses submitted by the plurality of users to a third group of assessment items corresponding to a second hierarchical content level that includes the assessment item, and calculating a fifth average grade corresponding to fifth responses submitted by the plurality of users to the assessment item.

In some embodiments, the first responses and the second responses may correspond to first attempts by the user, and wherein the third responses, fourth responses, and fifth responses correspond to first attempts by the plurality of users.

In some embodiments, the method may include steps of performing, with the at least one computer processor, a comparison between the correct first attempt probability and a predetermined threshold, and determining, with the at least one computer processor based on the comparison, that the correct first attempt probability exceeds the predetermined threshold.

In some embodiments, the method may include steps of sending, with the at least one computer processor upon determining that the correct first attempt probability exceeds the predetermined threshold, a recommendation to the external server indicating that credit should be automatically given to the user for the assessment item without requiring the user to submit a response to the assessment item.

The above features and advantages of the present invention will be better understood from the following detailed description taken in conjunction with the accompanying drawings.

DETAILED DESCRIPTION

Figure 1:
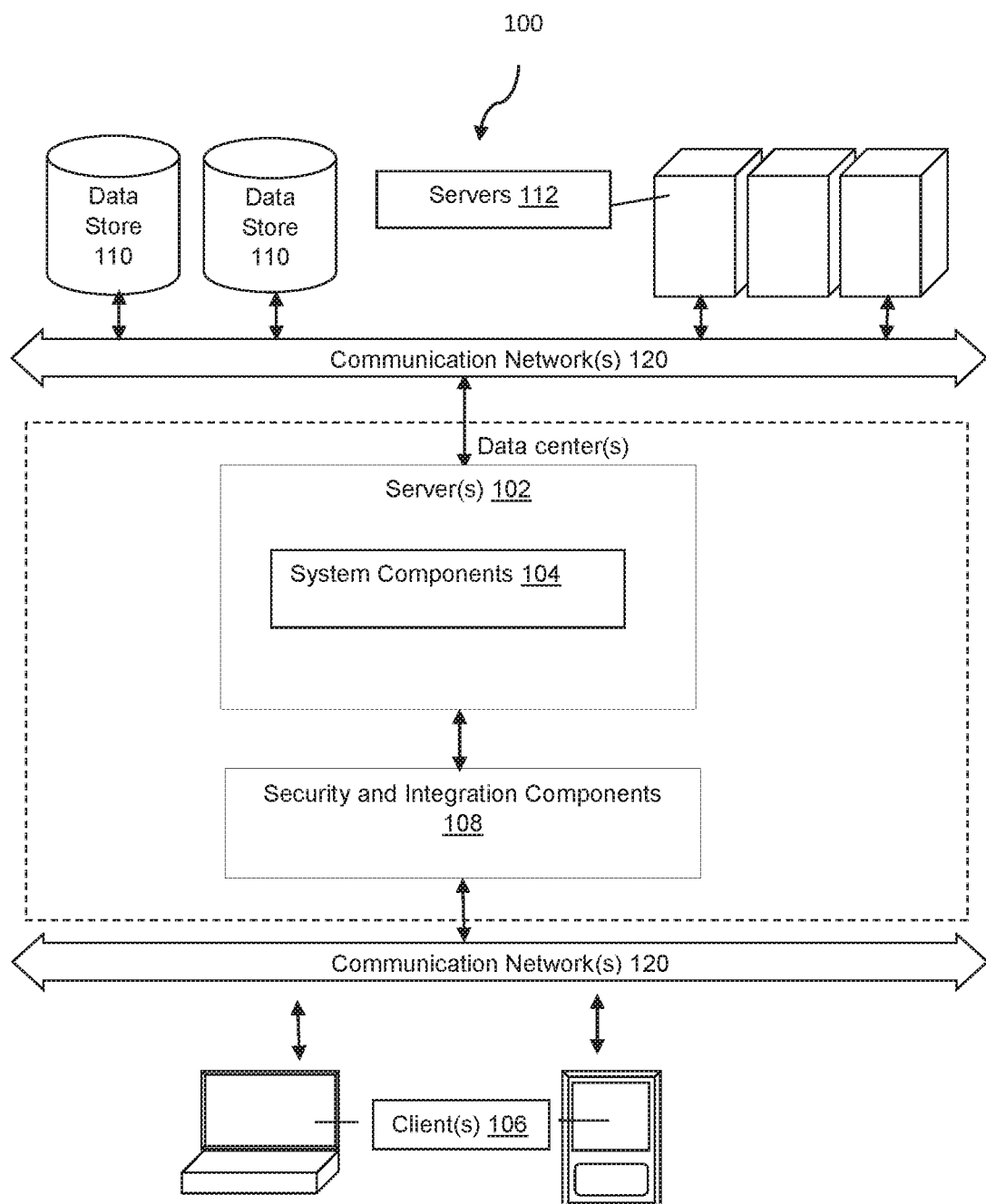
FIG. 1 illustrates a system level block diagram showing one or more data stores, data centers, servers, and clients of a distributed computing environment, in accordance with an embodiment.

The present invention will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

FIG. 1 illustrates a non-limiting example of a distributed computing environment 100, which includes one or more computer server computing devices 102, one or more client computing devices 106, and other components that may implement certain embodiments and features described herein. Other devices, such as specialized sensor devices, etc., may interact with client 106 and/or server 102. The server 102, client 106, or any other devices may be configured to implement a client-server model or any other distributed computing architecture.

Server 102, client 106, and any other disclosed devices may be communicatively coupled via one or more communication networks 120. Communication network 120 may be any type of network known in the art supporting data communications. As non-limiting examples, network 120 may be a local area network (LAN; e.g., Ethernet, Token-Ring, etc.), a wide-area network (e.g., the Internet), an infrared or wireless network, a public switched telephone networks (PSTNs), a virtual network, etc. Network 120 may use any available protocols, such as (e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

Figure 2:
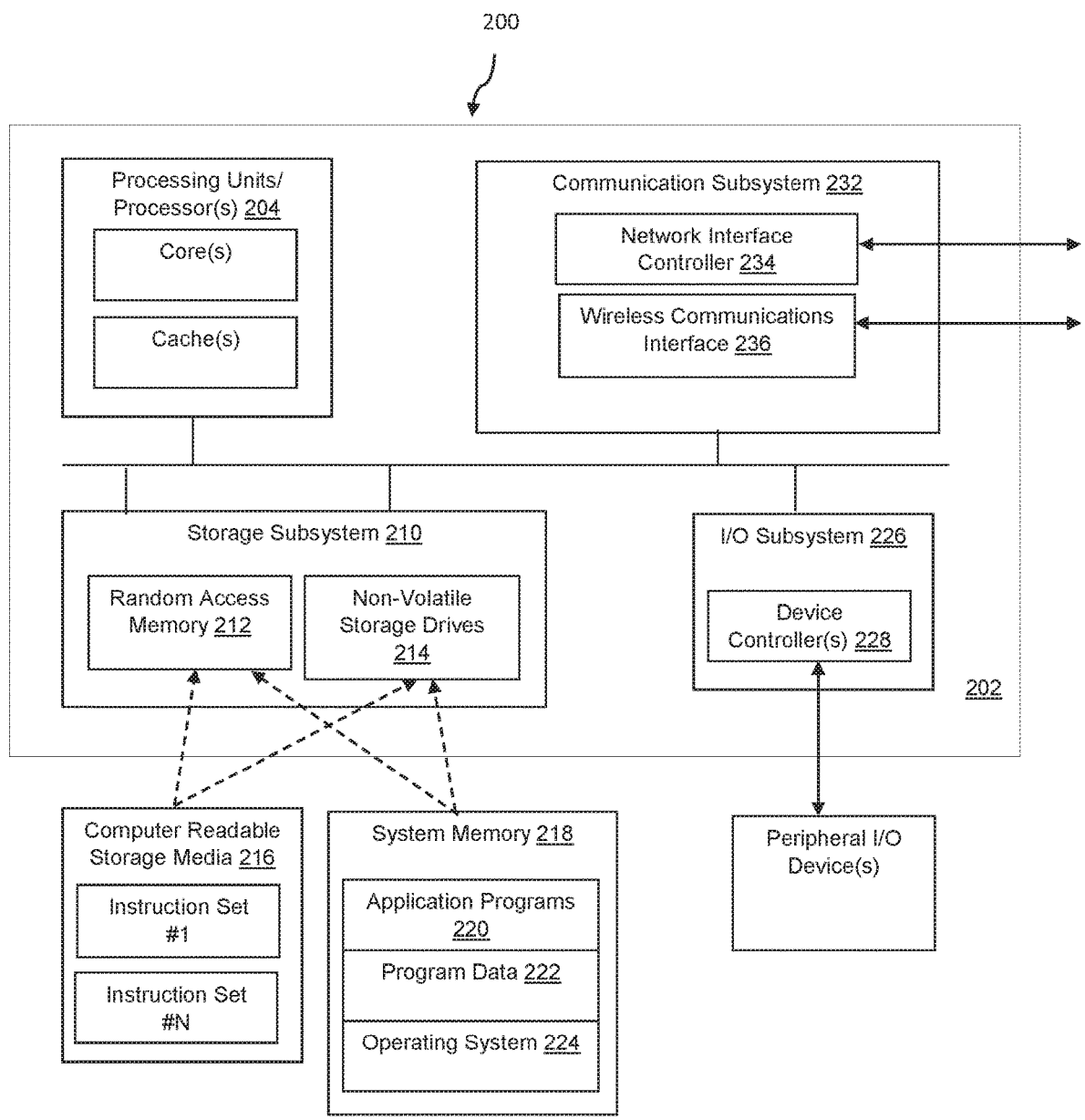
FIG. 2 illustrates a system level block diagram showing physical and logical components of a special-purpose computer device within a distributed computing environment, in accordance with an embodiment.

The embodiments shown in FIGS. 1-2 are thus one example of a distributed computing system, which is not intended to be limiting. The subsystems and components within the server 102 and client devices 106 may be implemented in hardware, firmware, software, or combinations thereof. Various different subsystems and/or components 104 may be implemented on server 102. Users operating the client devices 106 may initiate one or more client applications to use services provided by these subsystems and components. Various different system configurations are possible in different distributed computing systems 100 and content distribution networks. Server 102 may be configured to run one or more server software applications or services, for example, web-based or cloud-based services, to support content distribution and interaction with client devices 106. Users operating client devices 106 may in turn utilize one or more client applications (e.g., virtual client applications) to interact with server 102 to utilize the services provided by these components. Client devices 106 may be configured to receive and execute client applications over one or more networks 120. Such client applications may be web browser based applications and/or standalone software applications, such as mobile device applications. Client devices 106 may receive client applications from server 102 or from other application providers (e.g., public or private application stores).

As shown in FIG. 1, various security and integration components 108 may be used to manage communications over network 120 (e.g., a file-based integration scheme or a service-based integration scheme). Security and integration components 108 may implement various security features for data transmission and storage, such as authenticating users or restricting access to unknown or unauthorized users, As non-limiting examples, these security components 108 may comprise dedicated hardware, specialized networking components, and/or software (e.g., web servers, authentication servers, firewalls, routers, gateways, load balancers, etc.) within one or more data centers in one or more physical location and/or operated by one or more entities, and/or may be operated within a cloud infrastructure.

In various implementations, security and integration components 108 may transmit data between the various devices in the content distribution network 100. Security and integration components 108 also may use secure data transmission protocols and/or encryption (e.g., File Transfer Protocol (FTP), Secure File Transfer Protocol (SFTP), and/or Pretty Good Privacy (PGP) encryption) for data transfers, etc.).

In some embodiments, the security and integration components 108 may implement one or more web services (e.g., cross-domain and/or cross-platform web services) within the content distribution network 100, and may be developed for enterprise use in accordance with various web service standards (e.g., the Web Service Interoperability (WS-I) guidelines). For example, some web services may provide secure connections, authentication, and/or confidentiality throughout the network using technologies such as SSL, TLS, HTTP, HTTPS, WS-Security standard (providing secure SOAP messages using XML encryption), etc. In other examples, the security and integration components 108 may include specialized hardware, network appliances, and the like (e.g., hardware-accelerated SSL and HTTPS), possibly installed and configured between servers 102 and other network components, for providing secure web services, thereby allowing any external devices to communicate directly with the specialized hardware, network appliances, etc.

Computing environment 100 also may include one or more data stores 110, possibly including and/or residing on one or more back-end servers 112, operating in one or more data centers in one or more physical locations, and communicating with one or more other devices within one or more networks 120. In some cases, one or more data stores 110 may reside on a non-transitory storage medium within the server 102. In certain embodiments, data stores 110 and back-end servers 112 may reside in a storage-area network (SAN). Access to the data stores may be limited or denied based on the processes, user credentials, and/or devices attempting to interact with the data store.

With reference now to FIG. 2, a block diagram of an illustrative computer system is shown. The system 200 may correspond to any of the computing devices or servers of the network 100, or any other computing devices described herein. In this example, computer system 200 includes processing units 204 that communicate with a number of peripheral subsystems via a bus subsystem 202. These peripheral subsystems include, for example, a storage subsystem 210, an I/O subsystem 226, and a communications subsystem 232.

One or more processing units 204 may be implemented as one or more integrated circuits (e.g., a conventional microprocessor or microcontroller), and controls the operation of computer system 200. These processors may include single core and/or multicore (e.g., quad core, hexa-core, octo-core, ten-core, etc.) processors and processor caches. These processors 204 may execute a variety of resident software processes embodied in program code, and may maintain multiple concurrently executing programs or processes. Processor(s) 204 may also include one or more specialized processors, (e.g., digital signal processors (DSPs), outboard, graphics application-specific, general purpose graphics processing units (GPGPUs), and/or other processors).

Bus subsystem 202 provides a mechanism for intended communication between the various components and subsystems of computer system 200. Although bus subsystem 202 is shown schematically as a single bus, alternative embodiments of the bus subsystem may utilize multiple buses. Bus subsystem 202 may include a memory bus, memory controller, peripheral bus, and/or local bus using any of a variety of bus architectures (e.g. Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

I/O subsystem 226 may include device controllers 228 for one or more user interface input devices and/or user interface output devices, possibly integrated with the computer system 200 (e.g., integrated audio/video systems, and/or touchscreen displays), or may be separate peripheral devices which are attachable/detachable from the computer system 200. Input may include keyboard or mouse input, audio input (e.g., spoken commands), motion sensing, gesture recognition (e.g., eye gestures), etc.

As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like.

In general, use of the term "output device" is intended to include all possible types of devices and mechanisms for outputting information from computer system 200 to a user or other computer. For example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or non-visual displays such as audio output devices, etc. As non-limiting examples, output devices may include, indicator lights, monitors, printers, speakers, headphones, automotive navigation systems, plotters, voice output devices, modems, etc.

Computer system 200 may comprise one or more storage subsystems 210, comprising hardware and software components used for storing data and program instructions, such as system memory 218 and computer-readable storage media 216.

System memory 218 and/or computer-readable storage media 216 may store program instructions that are loadable and executable on processor(s) 204. For example, system memory 218 may load and execute an operating system 224, program data 222, server applications, client applications 220, Internet browsers, mid-tier applications, etc.

System memory 218 may further store data generated during execution of these instructions. System memory 218 may be stored in volatile memory (e.g., random access memory (RAM) 212, including static random access memory (SRAM) or dynamic random access memory (DRAM)). RAM 212 may contain data and/or program modules that are immediately accessible to and/or operated and executed by processing units 204.

System memory 218 may also be stored in non-volatile storage drives 214 (e.g., read-only memory (ROM), flash memory, etc.) For example, a basic input/output system (BIOS), containing the basic routines that help to transfer information between elements within computer system 200 (e.g., during start-up) may typically be stored in the non-volatile storage drives 214.

Storage subsystem 210 also may include one or more tangible computer-readable storage media 216 for storing the basic programming and data constructs that provide the functionality of some embodiments. For example, storage subsystem 210 may include software, programs, code modules, instructions, etc., that may be executed by a processor 204, in order to provide the functionality described herein. Data generated from the executed software, programs, code, modules, or instructions may be stored within a data storage repository within storage subsystem 210.

Storage subsystem 210 may also include a computer-readable storage media reader connected to computer-readable storage media 216. Computer-readable storage media 216 may contain program code, or portions of program code. Together and, optionally, in combination with system memory 218, computer-readable storage media 216 may comprehensively represent remote, local, fixed, and/or removable storage devices plus storage media for temporarily and/or more permanently containing, storing, transmitting, and retrieving computer-readable information.

Computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 200.

By way of example, computer-readable storage media 216 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 216 may include, but is not limited to, Zip® drives, flash memory cards, universal serial bus (USB) flash drives, secure digital (SD) cards, DVD disks, digital video tape, and the like. Computer-readable storage media 216 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 200.

Communications subsystem 232 may provide a communication interface from computer system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 236 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

In some embodiments, communications subsystem 232 may also receive input communication in the form of structured and/or unstructured data feeds, event streams, event updates, and the like, on behalf of one or more users who may use or access computer system 200. For example, communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, communications subsystem 232 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 232 may output such structured and/or unstructured data feeds, event streams, event updates, and the like to one or more data stores that may be in communication with one or more streaming data source computers coupled to computer system 200.

The various physical components of the communications subsystem 232 may be detachable components coupled to the computer system 200 via a computer network, a Fire-Wire® bus, or the like, and/or may be physically integrated onto a motherboard of the computer system 200. Communications subsystem 232 also may be implemented in whole or in part by software.

Due to the ever-changing nature of computers and networks, the description of computer system 200 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 3:
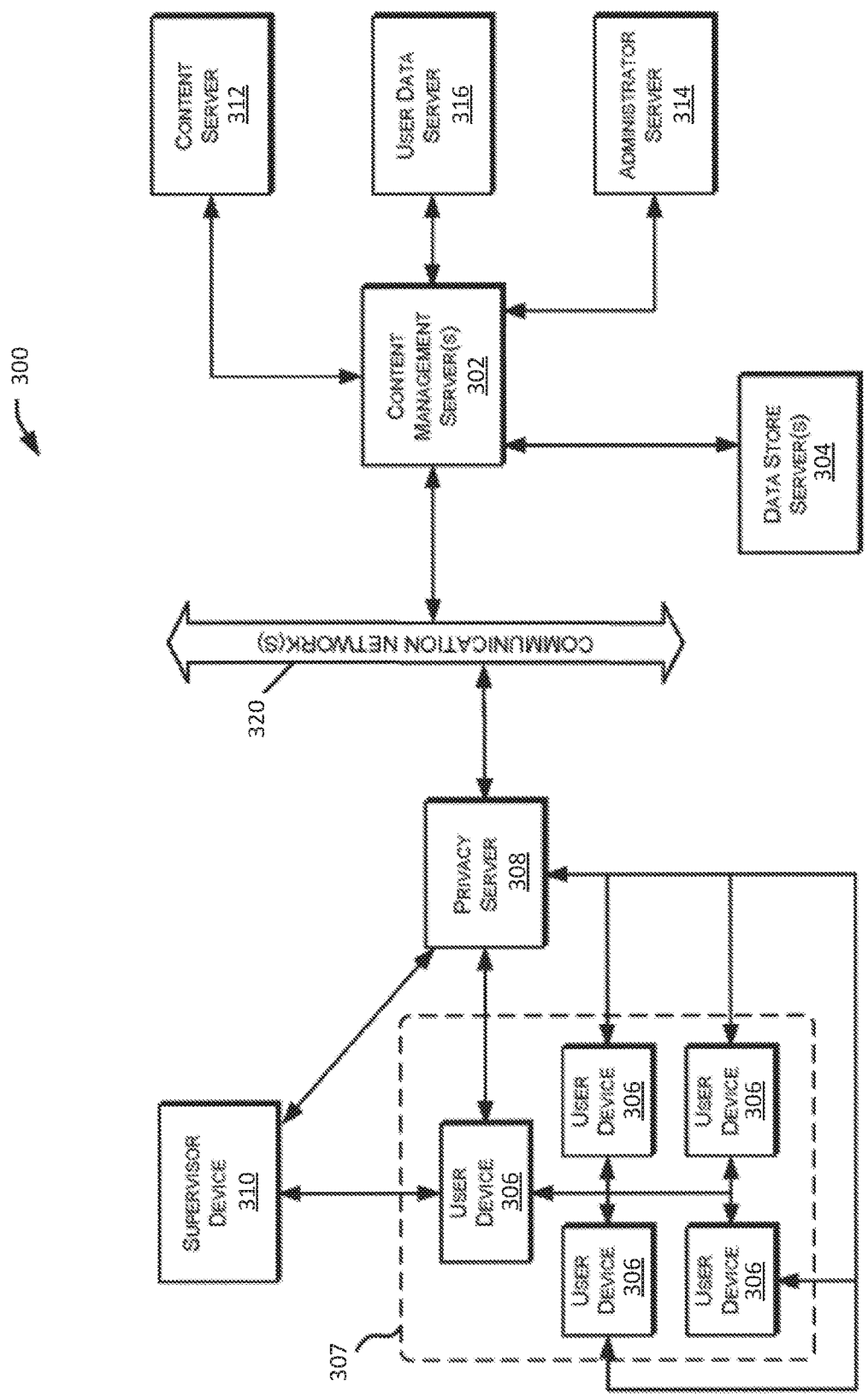
FIG. 3 illustrates a block diagram of an example content distribution network, in accordance with an embodiment.

With reference now to FIG. 3, a block diagram is shown illustrating various components of a content distribution network (CDN) 300 which implements and supports certain embodiments and features described herein. In some embodiments, the content distribution network 300 may include one or several physical components and/or one or several virtual components such as, for example, one or several cloud computing components. In some embodiments, the content distribution network 300 may include a mixture of physical and cloud computing components.

Content distribution network 300 may include one or more content management servers 302. Content management servers 302 may include any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. For example, the content management servers 302 may correspond to the computer server 102 of FIG. 1. Content management server 302 may include one or more server farms, clusters, or any other appropriate arrangement and/or combination or computer servers. Content management server 302 may act according to stored instructions located in a storage subsystem (e.g., storage subsystem 210 of FIG. 2) of the server 302, and may run an operating system, including any commercially available server operating system and/or any other operating systems discussed herein.

The content distribution network 300 may include one or more data store servers 304, such as database servers and file-based storage systems. The data store servers 304 can access data that can be stored on a variety of hardware components.

Data store servers 304 may comprise stored data relevant to the functions of the content distribution network 300. In some embodiments, multiple data stores may reside on a single server 304, either using the same storage components of server 304 or using different physical storage components to assure data security and integrity between data stores. In other embodiments, each data store may have a separate dedicated data store server 304.

Content distribution network 300 also may include one or more user devices 306 and/or supervisor devices 310. User devices 306 and supervisor devices 310 may display content received via the content distribution network 300, and may support various types of user interactions with the content. User devices 306 and supervisor devices 310 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 306 and supervisor devices 310 may be general purpose personal computers or special-purpose computing devices including, by way of example, personal computers, laptop computers, workstation computers, projection devices, and interactive room display systems. Additionally, user devices 306 and supervisor devices 310 may be any other electronic devices, such as a thin-client computers, an Internet-enabled gaming systems, business or home appliances, and/or a personal messaging devices, capable of communicating over network(s) 320.

In different contexts of content distribution networks 300, user devices 306 and supervisor devices 310 may correspond to different types of specialized devices, for example, student devices and teacher devices in an educational network, employee devices and presentation devices in a company network, different gaming devices in a gaming network, clinician/teacher devices and patient/student devices in a clinical diagnosis or learning classification network, etc. Additionally, different user devices 306 and supervisor devices 310 may be assigned different designated roles, such as presenter devices, teacher devices, clinician devices, administrator devices, or the like, and in such cases the different devices may be provided with additional hardware and/or software components to provide content and support user capabilities not available to the other devices.

The content distribution network 300 also may include a privacy server 308 that maintains private user information at the privacy server 308 while using applications or services hosted on other servers. For example, the privacy server 308 may be used to maintain private data of a user within one jurisdiction even though the user is accessing an application hosted on a server (e.g., the content management server 302) located outside the jurisdiction. In such cases, the privacy server 308 may intercept communications between a user device 306 or supervisor device 310 and other devices that include private user information. The privacy server 308 may create a token or identifier that does not disclose the private information and may use the token or identifier when communicating with the other servers and systems, instead of using the user's private information.

The content distribution network 300 may include one or more communication networks 320. Although only a single network 320 is identified in FIG. 3, the content distribution network 300 may include any number of different communication networks between any of the computer servers and devices shown in FIG. 3 and/or other devices described herein. Communication networks 320 may enable communication between the various computing devices, servers, and other components of the content distribution network 300. Various implementations of content distribution networks 300 may employ different types of networks 320, for example, computer networks, telecommunications networks, wireless networks, and/or any combination of these and/or other networks.

As illustrated in FIG. 3, the content management server 302 may be in communication with one or more additional servers, such as a content server 312, an administrator server 314, and/or a user data server 316. Each of these servers may include some or all of the same physical and logical components as the content management server(s) 302, and in some cases, the hardware and software components of these servers 312-316 may be incorporated into the content management server(s) 302, rather than being implemented as separate computer servers.

Content server 312 may include hardware and software components to generate, store, and maintain the content resources for distribution to user devices 306 and other devices in the network 300. For example, in content distribution networks 300 used for professional training and educational purposes, or clinical diagnosis of students/patents, the content server 312 may include data stores of training materials, presentations, plans, syllabi, reviews, evaluations, interactive programs and simulations, course models, course outlines, assessments and diagnostic modules, and various training interfaces that correspond to different materials and/or different types of user devices 306.

Administrator server 314 may include hardware and software components to initiate various administrative functions at the content management server 302 and other components within the content distribution network 300. For example, the administrator server 314 may monitor device status and performance for the various servers, data stores, and/or user devices 306 in the content distribution network 300. When necessary, the administrator server 314 may add or remove devices from the network 300, and perform device maintenance such as providing software updates to the devices in the network 300. Various administrative tools on the administrator server 314 may allow authorized users to set user access permissions to various content resources, monitor resource usage by users and devices 306, and perform analyses and generate reports on specific network users and/or devices (e.g., resource usage tracking reports, training evaluations, etc.).

User data server 316 may include hardware and software components that store and process data for multiple users relating to each user's activities and usage of the content distribution network 300. For example, the content management server 302 may record and track each user's system usage, including their user device 306, content resources accessed, and interactions with other user devices 306. This data may be stored and processed by the user data server 316, to support user tracking and analysis features. For instance, in the contexts of professional training, education, and/or clinical diagnosis of students or patients, the user data server 316 may store and analyze digital assessments completed by each user or training materials viewed, presentations attended, courses or tests completed, the user's responses (i.e., submitted answers) to assessment items (i.e., questions or prompts) of the digital assessments (e.g., homework assignments, tests, formative assessments, summative assessments, and/or the like) or other interactions, assessment or evaluation results, and/or the like. Individual digital assessments may be included as part of a title, which may correspond to a particular course or textbook for a particular subject. A title may include multiple digital assessments. The digital assessments may be organized into objectives, which may be organized into sections, which may be organized into chapters. Each digital assessment may include a number of assessment items to which users may interact with and submit responses to. For example, each title may include one or more chapters, each chapter may include one or more sections, each sections may include one or more objectives, each objective may include one or more digital assessments, and each digital assessment may include one or more assessment items.

For example, when a user (sometimes referred to herein in this context as a responder) wholly or partially completes a digital assessment, the responses to each of the assessment items of the digital assessment that are responded to by the user may be stored in the user data server 316 (e.g., as response data). It should be understood that the methods described herein by which response data and corresponding user and assessment identifier information are stored are intended to be illustrative and not limiting. If desired, alternative organizational data storage paradigms may be used. As used herein, an "assessment item" refers to the smallest measurable part of any activity with built-in assessment (e.g., a tutorial, a formative, summative, or diagnostic test or quiz, or any other applicable activity). Assessment items may include, for example, selected response items (e.g., multiple-choice or true-or-false questions), and/or constructed response items (e.g., fill in the blank questions or graphing questions). The user data server 316 may then analyze the responses and generate grades for the responses corresponding to whether each response is correct or incorrect. In some embodiments, correct first attempt grades may be generated, which may be indicative of whether a user's first attempt at responding to an assessment item is correct (e.g., in which case a grade of "1" is generated) or incorrect (e.g., in which case a grade of "0" is generated). The generated grades may be stored in the data server 316. In some embodiments, assessment items may provide a user with the option of accessing a hint before responding to the assessment item. For each response stored in the data server 316, a corresponding aid usage value may also be stored (e.g., in a corresponding data entry), which may be used to indicate whether the user accessed a defined type of learning aid (e.g., a hint, an example problem and corresponding solution, and/or a guided solution) before responding to the corresponding assessment item. For example, an aid usage value of 1 indicates that aid of the defined type was utilized by the user when responding to the corresponding assessment item, while an aid usage value of 0 indicates that that type of aid was not utilized.

In some embodiments, the data store servers 304 may store assessment data corresponding to one or more digital assessments of one or more titles (e.g., books or courses). Assessment data stored in the data store servers 304 may include responses, grades, aid usage values, and responder (i.e., user) information (e.g., including user identifiers) for the assessment items the corresponding digital assessments and/or titles. For example, assessment data corresponding to an individual assessment item (which may sometimes be referred to as the assessment item data for that assessment item) may include a dataset (e.g., a look-up table (LUT)) of responders that have responded to the assessment item. Each entry of the dataset may correspond to a different responder and may include the user ID of the responder, an assessment item identifier from which the assessment item, assessment, objective, section, chapter, and title of the corresponding assessment item may be determined, a grade for the response (e.g., 1 for a correct answer and 0 for an incorrect answer), and an aid usage value for the response (e.g., 1 if aid of a defined type was used and 0 otherwise).

Assessment data corresponding to a given user and/or assessment data corresponding to one or more pieces of content across one or more hierarchical content levels (e.g., title, chapter, section, objective, assessment, and assessment item levels) may be analyzed (e.g., by one or more computer processors such as processors 204 of FIG. 2) in order to determine the probability (sometimes referred to herein as a correct first attempt probability) that the given user will respond correctly to a given assessment item on their first attempt. In some embodiments, a "first attempt" or "first attempt response" may be defined as the first response submitted by a user to an assessment item, and would not include subsequent responses submitted by the user to the assessment item. In other embodiments, a "first attempt" may be defined as the first predefined number of responses a user submits to an assessment item (e.g., the first three responses), where if any of the first predefined number of responses are correct, the user's "first attempt" is considered to be correct. Machine learning models, which may include a random forest model, may be trained and applied to perform this determination of correct first attempt probability, given a set of feature data corresponding to a user and an assessment item for which the correct first attempt probability is being determined, as will be described.

Correct first attempt probability, as a metric, may have many practical applications. For example, a user that has been assigned a set of assessment items to complete (e.g., as a homework assignment) may already be skilled enough to correctly answer a portion of the assigned assessment items. Rather than have the user respond to assessment items that the user likely already knows how to correctly answer, a system may process assessment data related to the user and the assessment items (e.g., using a trained machine learning model) to determine a respective correct first attempt probability value for the user for each of the assessment items. The system may then identify assessment items corresponding to a correct first attempt probability value that exceeds a predetermined threshold (e.g., 70%, 80%, or 90%). These identified assessment items may then automatically be given credit (e.g., marked as correct) without requiring the user to submit a response. In this way, a user may avoid having to answer assessment items that they are already likely capable of answering correctly, and the user may spend more time answering assessment items that may be more difficult for them, so that the user may focus more on content that they need to practice, the user may save time, and homework may be made more efficient. In some embodiments, a given instructor may access an instructor user interface (e.g., of a web browser or application) via an instructor device (e.g., personal computer, mobile/smart phone, etc.), and through this instructor interface may adjust this predetermined threshold, or any other threshold described herein. Additionally, the given instructor may select whether or not to enable the automatic assignment of credit for student assignments in this way by modifying (e.g., toggling) a corresponding setting via interaction with the instructor user interface.

Figure 4:
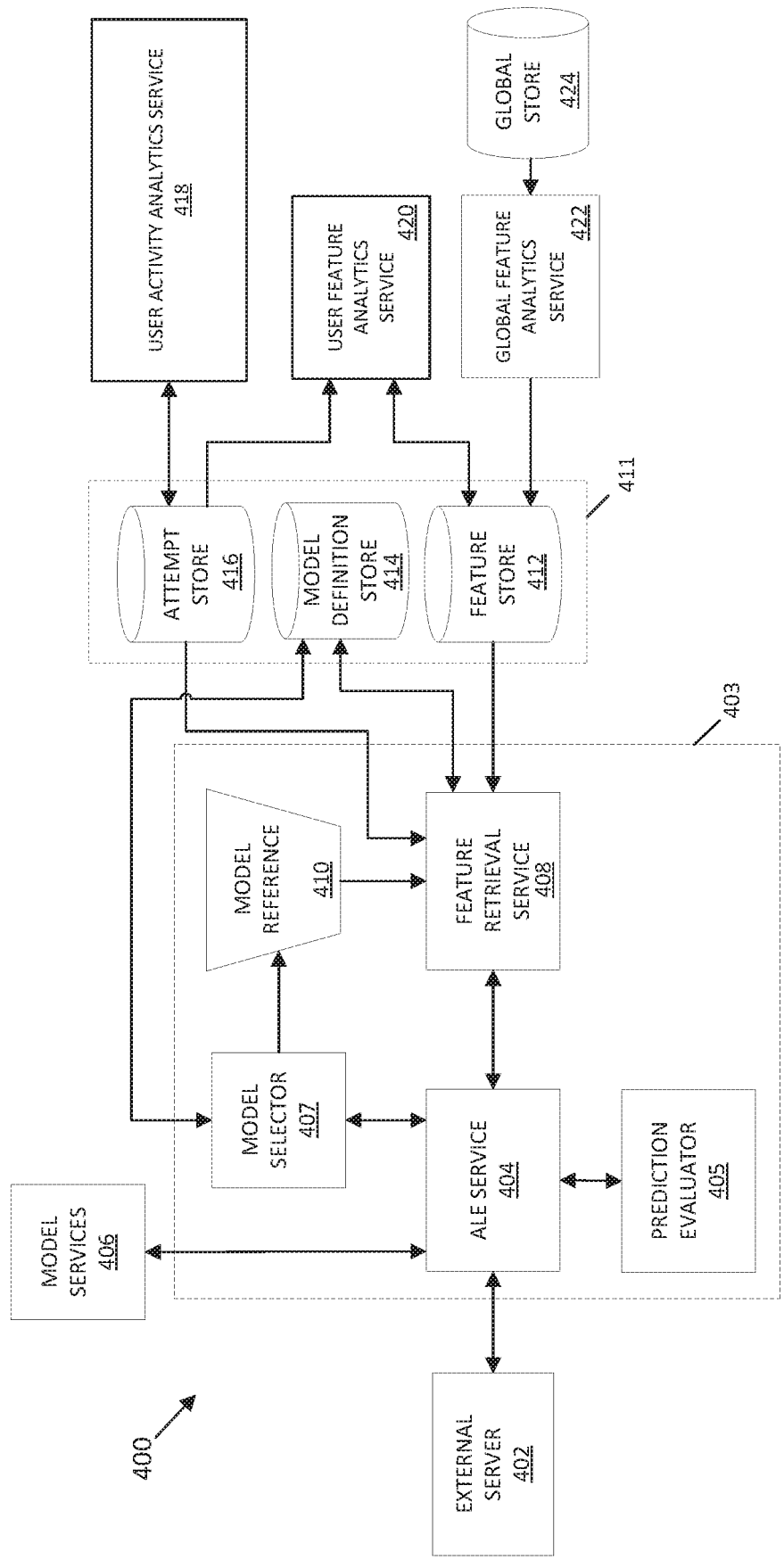
FIG. 4 illustrates a block diagram of an example logical architecture for the application of and acquisition of feature data for a selected machine learning model, in accordance with an embodiment.

FIG. 4 shows a system 400 that may be implemented by one or more servers (e.g., servers 112 and data stores 110 of FIG. 1; system 200 of FIG. 2, servers 302, 304, 312, 314, and/or 316 of FIG. 3) to collect assessment data, generate feature data from the feature data according to one or more model definitions, retrieve feature data corresponding to a model definition of a selected machine learning model, processing the retrieved feature data using the selected machine learning model to produce a result (e.g., a correct first attempt probability), and generating a prediction based on the result (e.g., a prediction of whether a given user will respond correctly to an assessment item). For example, the system 400 may be included in the content distribution network 300 of FIG. 3, and may be communicatively coupled to or partially implemented by any applicable devices thereof.

The system 400 includes an adaptive learning engine (ALE) 403, machine learning model services 406 (sometimes referred to as "model services 406"), data stores 411, a user activity analytics service 418, a user feature analytics service 420, a global feature analytics service 422, and a global data store 424. The ALE 403 includes an ALE service 404, a prediction evaluator 405, a model selector 407, and a feature retrieval service 408. The data stores 411 include a feature store 412 (sometimes referred to as "feature data store 412"), a model definition store 414 (sometimes referred to as "model definition data store 414"), and an attempt store 416 (sometimes referred to as "attempt data store 416"). Some or all of the ALE service 404, the feature retrieval service 408, and each of the machine learning model services 406 may include representational state transfer (REST) application programming interfaces (APIs). The data stores 411 may be maintained on one or more memory devices (e.g., storage subsystem 210 of FIG. 2) of one or more of the servers that implement the system 400.

In some embodiments, some or all of the ALE engine 403, the data stores 411, the user activity analytics service 418, the user feature analytics service 420, the global feature analytics service 422, and the global data store 424 may be implemented by one or more processors and/or memory devices associated with one or several servers (e.g., servers 112 and data stores 110 of FIG. 1; system 200 of FIG. 2; servers 302, 304, 312, 314, and/or 316 of FIG. 3). For example, the ALE engine 403 may be executed by a first processor running on a first server (e.g., one of the content management servers 302, FIG. 3), the data stores 411 and/or the global store 424 may be stored in one or more memory devices of the first server or may be included in one or more data store servers (e.g., data store servers 304, FIG. 3) in electronic communication with the first server, The user activity analytics service 418 may be implemented by one or more processors of the first server, or by those of an administrative server (e.g., administrative server 314, FIG. 3) coupled to the first server. The user feature analytics service 420 may be executed by one or more processors of the first server, or by those of a user data server (e.g., user data server 316, FIG. 3) coupled to the first server. The global feature analytics service 422 may be executed by one or more processors of the first server, or by those of a user data server (e.g., user data server 316, FIG. 3) coupled to the first server. Each of the model services 406 may be executed by one or more processors of the first server, or by those of a user data server (e.g., user data server 316, FIG. 3) coupled to the first server. In some embodiments, the first server may instead be a server cluster, server farm, or a cloud-based server. In some embodiments, the external server 402 may be a second server that is in electronic communication with the first server (e.g., a second server of the content management servers 302, FIG. 3).

An external server 402 may be in electronic communication with the ALE service. For example, the external server 402 may be coupled to one or more servers (e.g., system 200 of FIG. 2) executing the ALE service 404 through an electronic communication network (e.g., networks 120, 320, FIGS. 1 and 3). The external server 402 may send a request to the ALE service 404. The request may, for example, identify a user, a set of assessment items, and request data that may be used as a basis for selecting a machine learning model to be used in calculating correct first try probabilities for the user for the assessment items. For example, the request data may identify a title and course that the request corresponds to. In some embodiments, the request data may also identify a custom user group that includes the user associated with the request.

The model selector 407 may receive the request data from the ALE service 404. The model selector 407 may reference the request data against the model definition store 414 to identify a model reference 410 corresponding to one of the model definitions stored in the model definition store 414. For example, the model selector 407 may compare the title, course, and/or custom user group included in the request data to a database or look-up table (LUT) included in the model definition store 414, which stores predetermined associations between such request data (e.g., combinations of title, course, and/or custom user group) and various model definitions. Upon identifying a model definition that is associated in the database or LUT with the request data received from the external server 402 via the ALE service 404, the model selector may send a model reference 410 to the feature retrieval service 408. For example, the model reference 410 may identify which model definition should be retrieved by the feature retrieval service 408.

A model definition may be loaded (e.g., manually loaded) into the model definition store 414 in order to populate the model definition store 414. The feature retrieval service 408 may later retrieve a model definition from the model definition store 414 based on the model reference 410 received from the model selector 407.

In some embodiments, a default machine learning model may be automatically selected for use in processing the request, and the model reference 410 retrieved by the model selector 407 from the model definition store 414 may correspond to the default machine learning model. The corresponding model definition that is retrieved by the feature retrieval service 408 based on the model reference 410 may define which feature data should be provided as inputs to the selected machine learning model (e.g., to a corresponding model service of the model services 406 that is configured to execute the selected machine learning model).

Machine learning models available for selection may include models based on different algorithms, such as random forest, artificial neural networks, kernel principal component analysis, decision trees with boosting, logistic regression, or any other applicable machine learning model algorithm. Additionally, machine learning models available for selection may include models that use the same algorithm, but that have been trained using different sets of data. For example, different machine learning models could be trained using only assessment data limited to one or more of: content corresponding to a particular use type (e.g., quizzes, study plans, tests, and/or homework), users corresponding to a particular user type (e.g., underperforming ("struggling") learners, moderately skilled learners, and/or expert learners), content corresponding to a particular course or title, users corresponding to a particular geographic region, user/content pairs corresponding to a particular course timing (e.g., whether a given course occurs during spring, summer, or fall, though other type of time stratifications, such as the particular months or years in which courses are offered, may be used), or content corresponding to a particular topic (e.g., mathematics, history, language, etc.).

Once a model definition has been retrieved from the model data store 414, the feature retrieval service 408 may retrieve corresponding feature data from the feature data store 412 of the data stores 411 according to the model definition. The retrieved feature data may be provided to a selected machine learning model service of the machine learning model services 406, which inputs the retrieved feature data to the selected machine learning model for processing. The selected machine learning model service may be selected by the ALE service 404 based on the machine learning model definition retrieved by the feature retrieval service 408. For example, the feature retrieval service may provide the machine learning model definition that it has retrieved from the model definition store 414 to the ALE service 404, which the ALE service 404 may use as a basis for selecting one of the machine learning model services 406 that is configured to execute the machine learning model that corresponds to that machine learning model definition. Upon execution, the machine learning model, which may be executed via the selected model service of the model services 406, may output a respective correct first attempt probability for the user for each of the assessment items defined in the request received from the external server 402. The correct first attempt probabilities may be provided to the prediction evaluator 405, which may compare each correct first attempt probability to a predefined threshold (e.g., 70%, 80%, or 90%). If the prediction evaluator 405 determines that a given correct first attempt probability exceeds the predefined threshold, the ALE service 404 may send a recommendation to the external server 402, indicating that credit should automatically be given to the user for the assessment item corresponding to the given correct first attempt probability (e.g., that assessment item should automatically be marked correct). In some embodiments, the external server 402 may then automatically give the user credit for assessment items according to recommendations received from the ALE service 404. Alternatively, an administrator (or some other privileged user) may manually identify which of the assessment items recommended by the ALE service 404 actually receive automatic credit.

Regarding the generation of the feature data stored in the feature data store 412, the feature data may be organized into one or more databases, and may be retrieved and input to selected machine learning models executed at a selected machine learning model service of the machine learning model service 406. In some embodiments, the feature data may include correct first attempt rates. These correct first attempt rates may be determined for an individual user (in which case they are referred to herein as user correct first attempt rates) or across multiple (e.g., all) responders (in which case they are referred to herein as global correct first attempt rates) for one or more hierarchical levels of content.

A given user correct first attempt rate may be calculated (e.g., periodically according to a schedule) by a user feature analytics service 420 based on grades of "first attempt" responses that were submitted to assessment items of a particular piece of content. For example, the user correct first attempt rate for given content may be calculated as an average of the grades of "first attempt" responses submitted to the assessment items of the content by the individual user. For example, for user correct first attempt rates, this content may include titles that the user has wholly or partially completed, chapters that the user has wholly or partially completed, the last five assessment items completed by the user, the last three assessment items completed by the user, and the last assessment item completed by the user.

As used in the present example, user "wholly" completes a piece of content when they have submitted responses to all assessment items of the content, and "partially" completes the content when they have submitted responses to only a portion of the assessment items of the content. Content referred to simply as having been "completed" by the user may be assumed to refer to "wholly" completed content.

A given global correct first attempt rate may be calculated (e.g., periodically according to a schedule) by a global feature analytics service 422 based on the grades of all "first attempt" responses submitted by multiple (e.g., all) responders to assessment items of the corresponding content. For example, for global correct first attempt rates, this content may be defined as a title, chapter, section, objective, assessment, or individual assessment item. In some embodiments, a respective global correct first attempt rate may be calculated (e.g., by the global feature analytics service 422) for each piece of content at each hierarchical level for which assessment data is available. For example, the global correct first attempt rate for a given piece of content may be calculated as an average of the grades of the "first attempt" responses submitted to the assessment items of the content by all responders that have submitted responses to the content.

In some embodiments, a given response submitted by an individual user that would otherwise be considered a "first attempt" response may be omitted from the determination of the user or global correct first attempt rates if the aid usage value of that response indicates that aid of the determined type was utilized by the user prior to submitting the response (i.e., the aid usage value equals 1). In this way, initial responses submitted after an "excessive" amount of aid has been received by a corresponding user for the corresponding assessment items may be omitted from these calculations, as such aid may cause a given initial response to not accurately reflect the ability of the corresponding user.

Correct first attempt rates may be periodically determined on a per-user and/or global basis (i.e., calculated as described above by the analytics services 420 and 422 and subsequently stored in the feature store server 412. The global feature analytics service 422 may retrieve global assessment data (e.g., assessment data corresponding to all users, not just for an individual user) from a global data store 424, which may store assessment data for all users and all content of the system. The user feature analytics service 420 may retrieve user assessment data from one or more attempt data stores 416. The attempt data store 416 may be an individual attempt data store that stores assessment data for one or more individual users. This assessment data may include any responses that a given user has submitted to content and corresponding grades for those responses. The assessment data may further identify (e.g., via one or more content identifiers) one or more levels of content to which each response corresponds, which may include the assessment item to which the response corresponds and/or the chapter, section, title, objective, assessment, and/or homework assignment that include(s) that assessment item. The assessment data may further include, for a given response, a user identifier that identifies the user who submitted the response. In some embodiments, the assessment data may include time data indicating when a given response was submitted by the user. In this way, the most recent responses to assessment items submitted by the user may be identified by the system. The attempt data store 416 may be updated by a user activity analytics service 418, which may monitor and record the user's interactions with content of the system. In some embodiments, the attempt data store 416 may be updated by the user activity analytics service 418 in real time. In contrast, the global data store 424 may be updated in scheduled batch jobs. As an example, each entry in the global data store 424 may define a user, a response submitted by the user, a grade for the content (e.g., correct or incorrect), the assessment item corresponding to the response, one or many content identifiers of hierarchical content levels associated with the assessment item (e.g., the title/course, section, chapter, objective, homework assignment, and/or assessment that includes the assessment item), whether the user responded to the assessment item correctly on their first try, and/or whether a corresponding learning aid was opened by the user before submitting the response. In some embodiments, the global data store 424 and/or the global feature analytics service 422 may be configured such that only data corresponding to selected books, courses, titles, or other content types (e.g., which may be defined in a configuration file associated with the global data store 424) are retrieved by and included in the global data store 424, or otherwise made available for use in global feature calculation by the global feature analytics service 422.

The particular correct first attempt rates that are calculated by the analytics services 420 and 422 (or by the feature retrieval service 408, in some embodiments) may be determined based on all possible correct first attempt rates that could be required by model definitions of the model definition store 414.

A given model definition of the model definition store 414 may correspond to a machine learning model that is configured (e.g., trained) to generate a prediction regarding a given user with respect to their expected performance when responding to a given piece of content (e.g., likelihood of responding correctly to an assessment item on the user's first attempt). For example, a model definition may require as feature data: user correct first attempt rates for the title level and the chapter level, for the last (i.e., most recent) five assessment items completed by the user, for the last three assessment items completed by the user, and for the last assessment item completed by the user, global correct first attempt rates for the title level, the chapter level, the section level, the objective level, the assessment level, and/or the assessment-item level, an average amount of time taken by the user to complete the last assessment item completed by the user, an average amount of time taken by the user to complete assessment items at the title level, the chapter level, over the last five assessment items completed by the user, and/or over the last three assessment items completed by the user, an item response theory (IRT) ability/skill level of the user calculated for one or more corresponding chapters, sections, and/or titles, an average number of attempts until a correct response is submitted by the user for the title level, the chapter level, the section level, the objective level, the assessment level, and/or the assessment item level, and/or correct first attempt rates of the user on content that is defined as prerequisite for the content for which a prediction is being made.

Based on one or more of the model definitions stored in the model definition store 414, the user feature analytics service 420 may periodically determine user correct first attempt rates for: all titles for each individual user (e.g., such that a user correct first attempt rate is calculated for every possible user-title pair for which assessment data exists), for all chapters for each individual user (e.g., such that a user correct first attempt rate is calculated for every possible user-chapter pair for which assessment data exists, for the five assessment items that each individual user has most recently responded to, for the three assessment items that each individual user has most recently responded to, and for the assessment item that each individual user has most recently responded to. Alternatively, as discussed below, the feature retrieval service may determine these user correct first attempt rates in near-real-time based on user activity data stored in the attempt store 416 (e.g., which itself may be updated to include user activity data or assessment data in near-real time).

Based on one or more of the model definitions stored in the model definition store 414, the global feature analytics service 422 may periodically determine, based on responses submitted by all applicable users, global correct first attempt rates for: all titles, all chapters, all sections, and all assessment items. These correct first attempt rates may be stored in the feature data store 412 as they are calculated. For example, the services 420 and 422 may be performed to generate feature data periodically according to a predetermined schedule (e.g., once every hour to once every twelve hours).

In an illustrative alternate embodiment, feature calculation may be performed in real time, rather than being performed in batches according to a predetermined schedule. In such embodiments, the user feature analytics service 420 may be omitted, and the feature retrieval service 408 may be executed instead to generate features based on user-specific data based on staged data (sometimes referred to herein as "staged assessment data") stored in the attempt store 416. The feature retrieval service 408 may determine which features to calculate and how to calculate those features based on the model definition of the model definition store 414 corresponding to the model reference 410, which may include instructions for how user-specific features are to be calculated. The global feature analytics service 422 may still calculate global feature data in batches based on data stored in the global data store 424, and may still store global features in the feature data store 412. However, user—specific features calculated by the feature retrieval service 408 that are calculated in near-real-time (e.g., with a delay of around 30 to 60 seconds, rather than a delay of around 6 hours) may be passed directly to the selected machine learning model service of the machine learning model services 406 as they are calculated, rather than being stored in the feature data store 412. The attempt store 416, instead of storing detailed data describing each response submitted by each user, may store aggregated or "staged" data for individual user activity at one or more content levels. For example, rather than storing a separate entry for each questioned answered by a given user in a given chapter (e.g., or other hierarchical content level, such as section, title, objective, or assessment), the attempt store 416 may include staged data which may include a total number of attempted answers submitted by the given user for questions in the given chapter and a total number of correct answers submitted by the given user for the questions in the given chapter. In some embodiments, other data may be included in the staged data, such as the number of hints used within a given hierarchical content level. Such staged data may be updated in near-real-time, as users submit responses to questions, which enables the feature retrieval service 408 to calculate corresponding features in near-real-time. By calculating user-specific features in near-real-time in this way, predictions made by the selected machine learning model service of the machine learning model services 406 may be more responsive and representative of recent user behavior. Additionally, by using staged data instead of including separate data entries for each response submitted by a user, less data has to be stored by the system, and processing time (e.g., for feature calculation) may be reduced.

Figure 5:
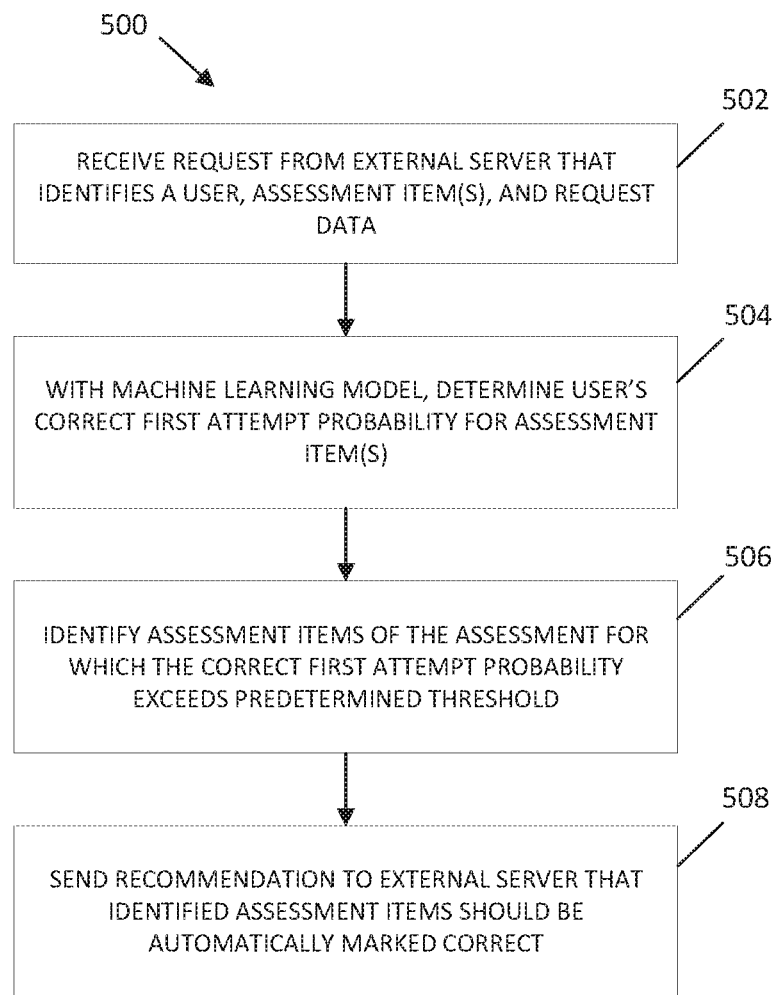
FIG. 5 illustrates a process flow diagram for a method of identifying assessment items that should be automatically marked correct based on a user's correct first attempt probability for those assessment items, in accordance with an embodiment.

Turning now to FIG. 5, an illustrative method 500 is shown by which assessment items that should be automatically given credit may be identified in response to a request received from an external server (e.g., server 402 of FIG. 4). The method 500 may be performed by executing instructions stored in a non-transitory computer-readable memory device (e.g., of storage subsystem 210 of FIG. 2) with one or more computer processors (e.g., processors 204 of FIG. 2). For example, the method 500 may be performed by the system 400 of FIG. 4.

At step 502, an ALE service (e.g., ALE service 404 of FIG. 4) receives a request from an external server (e.g., server 402 of FIG. 4). The request may identify a user (e.g., via a user identifier), one or more assessment items (e.g., via one or more assessment item identifiers), and request data (e.g., which may identify a test, course, and/or custom user group) to be processed.

At step 504, a machine learning model service (e.g., of machine learning model services 406 of FIG. 4) executes a machine learning model, which may be trained prior to the execution of the method 500, to determine a correct first attempt probability for the identified user for each of the identified assessment items. The machine learning model and corresponding model service may be identified by the ALE service based on a machine learning model definition that is retrieved by a feature retrieval service (e.g., feature retrieval service 408, FIG. 4) based on a model reference (e.g., model reference 410, FIG. 4) that is generated by a model selector (e.g., model selector 407, FIG. 4) based on the request data (e.g., by referencing the request data against a database or LUT of the model definition data store that stores associations between titles, courses, and/or custom user groups and machine learning model definitions). For example, the machine learning model service may process feature data retrieved from a feature data store (e.g., feature data store 412 of FIG. 4), the feature data corresponding to one or more user correct first response rates and/or global correct first response rates. For example, the feature data may be retrieved by the feature retrieval service, then passed to the machine learning model service via the ALE service. The particular feature data input to the machine learning model service may be determined based on the identified user, the identified assessment item for which the correct first attempt probability is being determined, and the machine learning model definition corresponding to the model reference.

At step 506, a prediction evaluator (e.g., prediction evaluator 405 of FIG. 4) compares the correct first response probabilities to a predefined threshold (e.g., 70%, 80%, or 90%), and the ALE service may identify any assessment items having correct first response probabilities that exceed the predefined threshold. In some embodiments, for example, the predefined threshold may be a value that is set by the instructor of a corresponding course, or a system administrator.

At step 508, the ALE service sends a recommendation to the external server, indicating that the identified assessment items having correct first response probabilities above the predefined threshold should be automatically marked as correct (e.g., assigned credit) without requiring a response from the user. In some embodiments, the recommended automatic assignment of credit and/or the sending of the recommendation may only be carried in response to the ALE service determining that a corresponding setting (e.g., an adaptive homework setting or adaptive assessment setting) is enabled in a configuration file stored in a memory device that is in electronic communication with the processor or processors executing the method 500. The configuration file may be modified by an instructor or administrator to enable or disable the automatic assignment of credit for one or more assessments, courses, or other hierarchical levels of content.

Figure 6:
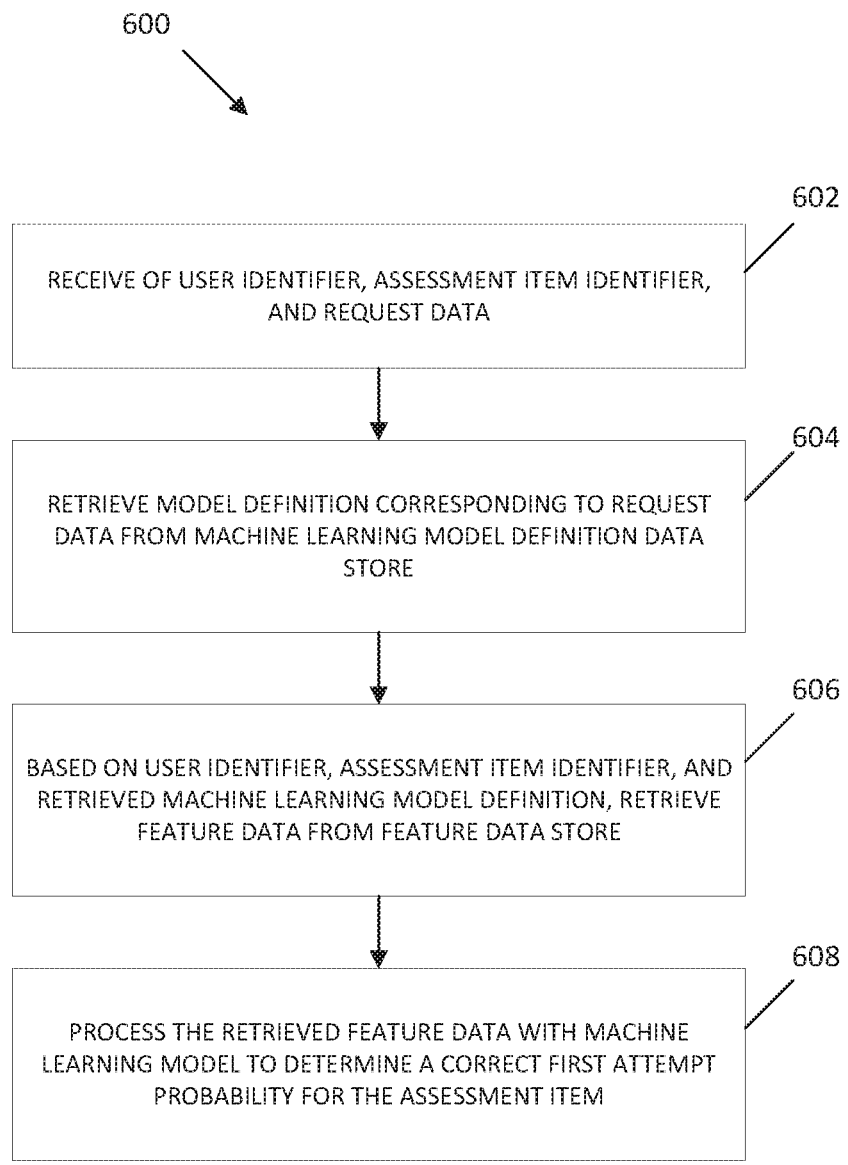
FIG. 6 illustrates a process flow diagram for a method of applying a machine learning model to determine a user's correct first attempt probability for assessment items, in accordance with an embodiment.

Turning now to FIG. 6, an illustrative method 600 is shown by which a correct first attempt probability may be determined for a selected user and assessment item via the application of a selected, trained machine learning model. The method 600 may be performed by executing instructions stored in a non-transitory computer-readable memory device (e.g., of storage subsystem 210 of FIG. 2) with one or more computer processors (e.g., processors 204 of FIG. 2). For example, the method 600 may be performed by the system 400 of FIG. 4. For example, the method 600 may be performed in connection with the performance of steps 502 and 504 of the method 500 of FIG. 5.

At step 602, a feature retrieval service (e.g., feature retrieval service 408 of FIG. 4) receives a user identifier, an assessment item identifier, and request data from an ALE service (e.g., ALE service 404 of FIG. 4) based on a request from an external server (e.g., server 402 of FIG. 4).

At step 604, the feature retrieval service retrieves a machine learning model definition based on a model reference (e.g., model reference 410 of FIG. 4), which may be generated by a model selector based on the request data, from a machine learning model definition data store (e.g., model definition data store 414 of FIG. 4). For example, the model selector may first reference a database or LUT of the model definition data store using the request data to determine which machine learning model definition is associated with the request data. The request data may identify a title, course, and/or custom user group, which may be collectively associated, in the database against which the request data is referenced, with a machine learning model definition included in the machine learning model definition data store. Then the model selector may generate a model reference that identifies the machine learning model definition of the machine learning model definition data store that is associated with the request data. The feature retrieval service may then retrieve the identified machine learning model definition from the machine learning model data store.

At step 606, the feature retrieval service retrieves feature data from a feature data store (e.g., feature data store 412 of FIG. 4) based on the user identifier, the assessment item identifier, and the retrieved machine learning model definition. The feature data of the feature data store may be periodically updated according to the method 700 of FIG. 7 and/or the method 800 of FIG. 8, for example. In some embodiments, the user-specific portion of the feature data may be calculated in near-real time according to at least a portion of the method 900 of FIG. 9, for example. The feature data may include user correct first attempt rates and global correct first attempt rates.

At step 608, a machine learning model service (e.g., a machine learning model service of the machine learning model services 406 of FIG. 4) processes the retrieved feature data with the machine learning model to determine a correct first attempt probability for the assessment item, which corresponds to an expected likelihood that the user will respond correctly to the assessment item on their first attempt. The machine learning model service may be selected from a group of machine learning model services by the ALE service based on the machine learning model definition that was retrieved by the feature retrieval service.

It should be understood that the method 600 may be repeated for each assessment item included in a request from the external server, if the request identifies multiple assessment items.

Figure 7:
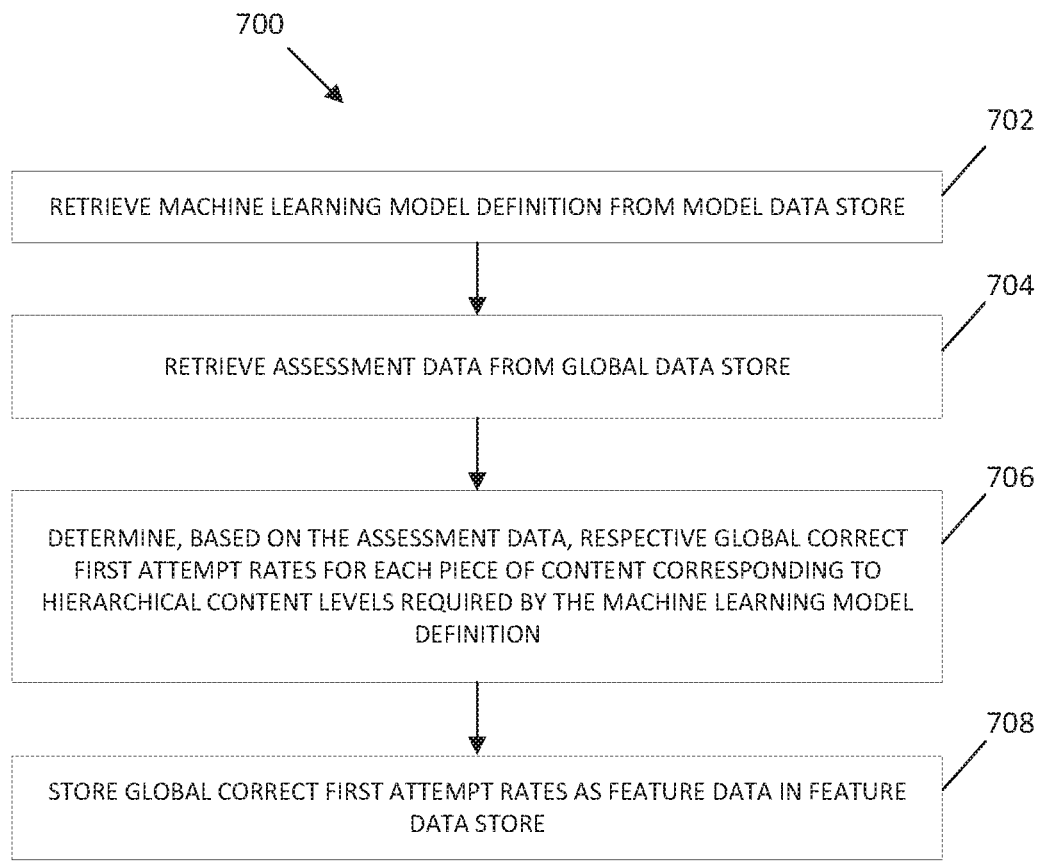
FIG. 7 illustrates a process flow diagram for a method of determining and storing global correct first attempt rates based on a machine learning model definition, in accordance with an embodiment.

Turning now to FIG. 7, an illustrative method 700 is shown by which global correct first attempt rates may be calculated and stored as feature data in a feature data store according to a machine learning model definition. The method 700 may be performed by executing instructions stored in a non-transitory computer-readable memory device (e.g., of storage subsystem 210, FIG. 2) with one or more computer processors (e.g., processors 204, FIG. 2). For example, the method 700 may be performed by the system 400 of FIG. 4.

At step 702, a feature retrieval service (e.g., feature retrieval service 408, FIG. 4) retrieves a machine learning model definition corresponding to a model reference (e.g., model reference 410, FIG. 4) from a machine learning model definition data store (e.g., model definition data store 414, FIG. 4). The model reference may be generated by a model selector (e.g., model selector 407, FIG. 4) based on request data included in a request received by an ALE service (e.g., ALE service 404, FIG. 4).

At step 704, an analytics service (e.g., global feature analytics service 422 of FIG. 4) retrieves assessment data from a global data store (e.g., global data store 424 of FIG. 4).

At step 706, the global feature analytics service determines, based on the assessment data, respective global correct first attempt rates for each piece of content corresponding to each piece of content represented in the assessment data that corresponds to hierarchical content levels required by the machine learning model definition. For example, the machine learning model definition may require global correct first attempt rates for content at the title or course level, the chapter level, the section level, the objective level, the assessment level, and the assessment-item level. In some embodiments, the content required by the machine learning model definition may only include content corresponding to the title/course, chapter, section, objective, and/or assessment that include the assessment item or assessment items for which a correct first attempt probability or correct first attempt probabilities are to be calculated by the machine learning model. The global feature analytics service would then determine separate global correct first attempt rates for each title of the assessment data, each chapter of the assessment data, each section of the assessment data, and each assessment item of the assessment data. As described previously, the global correct first attempt rate for a given piece of content may be calculated as an average of the grades of all "first attempt" responses submitted to assessment items of the given piece of content.

At step 708, the global correct first attempt rates is provided to and stored at a feature data store (e.g., feature data store 412 of FIG. 4) as feature data.

It should be understood that method 700 may be performed for each machine learning model definition of the machine learning model data store, and may be performed periodically according to a schedule.

Figure 8:
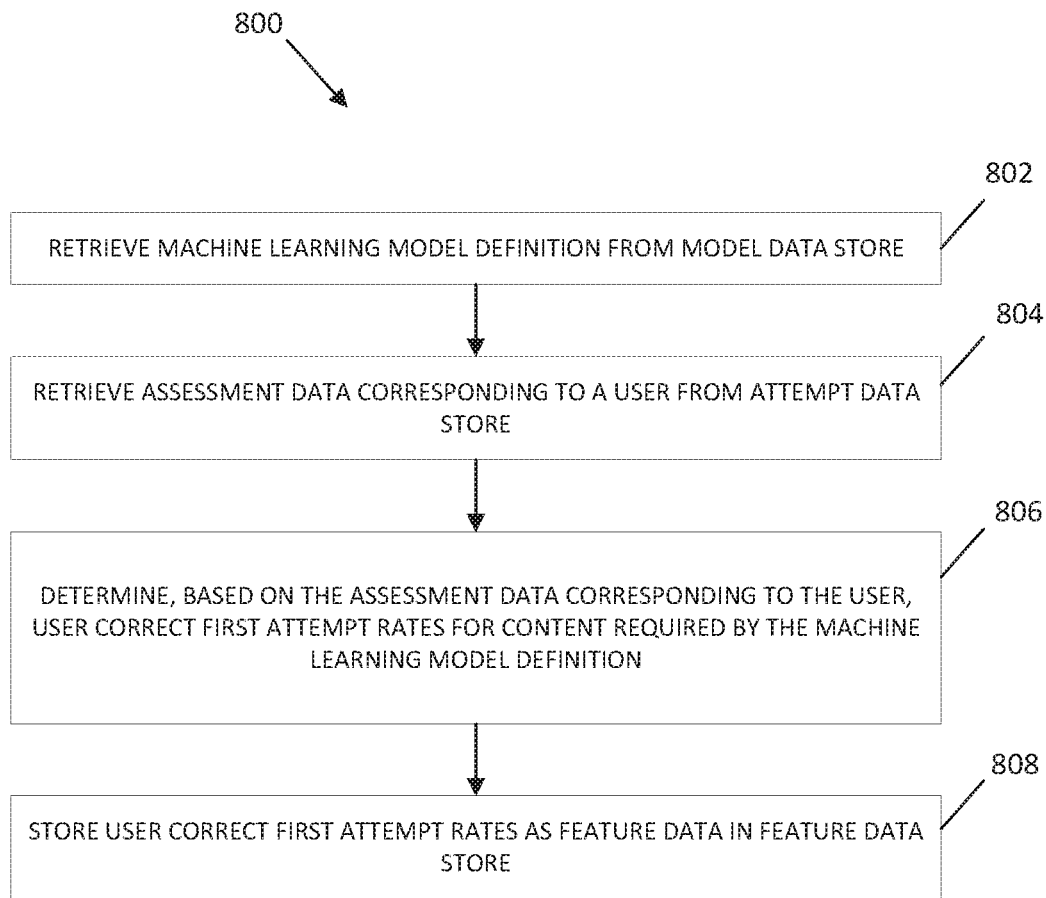
FIG. 8 illustrates a process flow diagram for a method of determining and storing user correct first attempt rates based on a machine learning model definition, in accordance with an embodiment.

Turning now to FIG. 8, an illustrative method 800 is shown by which user correct first attempt rates may be calculated and stored as feature data in a feature data store according to a machine learning model definition. The method 800 may be performed by executing instructions stored in a non-transitory computer-readable memory device (e.g., of storage subsystem 210, FIG. 2) with one or more computer processors (e.g., processors 204, FIG. 2). For example, the method 800 may be performed by the system 400 of FIG. 4.

At step 802, a feature retrieval service (e.g., feature retrieval service 408, FIG. 4) retrieves a machine learning model definition corresponding to a model reference (e.g., model reference 410, FIG. 4) from a machine learning model definition data store (e.g., model definition data store 414 of FIG. 4). The model reference may be generated by a model selector (e.g., model selector 407, FIG. 4) based on request data included in a request received by an ALE service (e.g., ALE service 404, FIG. 4).

At step 804, an analytics service (e.g., user feature analytics service 420 of FIG. 4) retrieves assessment data from an attempt data store (e.g., attempt data store 416 of FIG. 4). The attempt data store may include assessment data corresponding to individual users and their responses to assessment items. This assessment data may be updated (e.g., in real time or near-real-time) by a user activity analytics service (e.g., user activity analytics service 418 of FIG. 4) that tracks a user's activity and records responses submitted by the user, along with other related assessment data such as timestamps for response submissions and the grades of responses submitted by the user.

At step 806, the feature analytics service determines, for the user, user correct first attempt rates for each piece of content required by the machine learning model definition. For example, for a given user, the machine learning model definition may require, as feature data, user correct first attempt rates for the title level and the chapter level, for the last (i.e., most recent) five assessment items completed by the user, for the last three assessment items completed by the user, and for the last assessment item completed by the user, an average amount of time taken by the user to complete the last assessment item completed by the user, an average amount of time taken by the user to complete assessment items at the title level, the chapter level, over the last five assessment items completed by the user, and/or over the last three assessment items completed by the user, an item response theory (IRT) ability/skill level of the user calculated for one or more corresponding chapters, sections, and/or titles, an average number of attempts until a correct response is submitted by the user for the title level, the chapter level, the section level, the objective level, the assessment level, and/or the assessment item level, and/or correct first attempt rates of the user on content that is defined as prerequisite for the content for which a prediction is being made. As described previously, the user correct first attempt rate for a given piece of content may be calculated as an average of the grades of all "first attempt" responses submitted to assessment items of the given piece of content. This example is meant to be illustrative and not limiting, and it should be understood that more or fewer types of feature data may be required by various machine learning model definitions.

At step 808, the user correct first attempt rates is provided to and stored at a feature data store (e.g., feature data store 412 of FIG. 4) by the feature analytics service as at least part of a collection of feature data (sometimes referred to as a "feature vector") associated with the model definition.

It should be understood that method 800 may be performed for each machine learning model definition of the machine learning model data store, and may be performed periodically according to a schedule.

Figure 9:
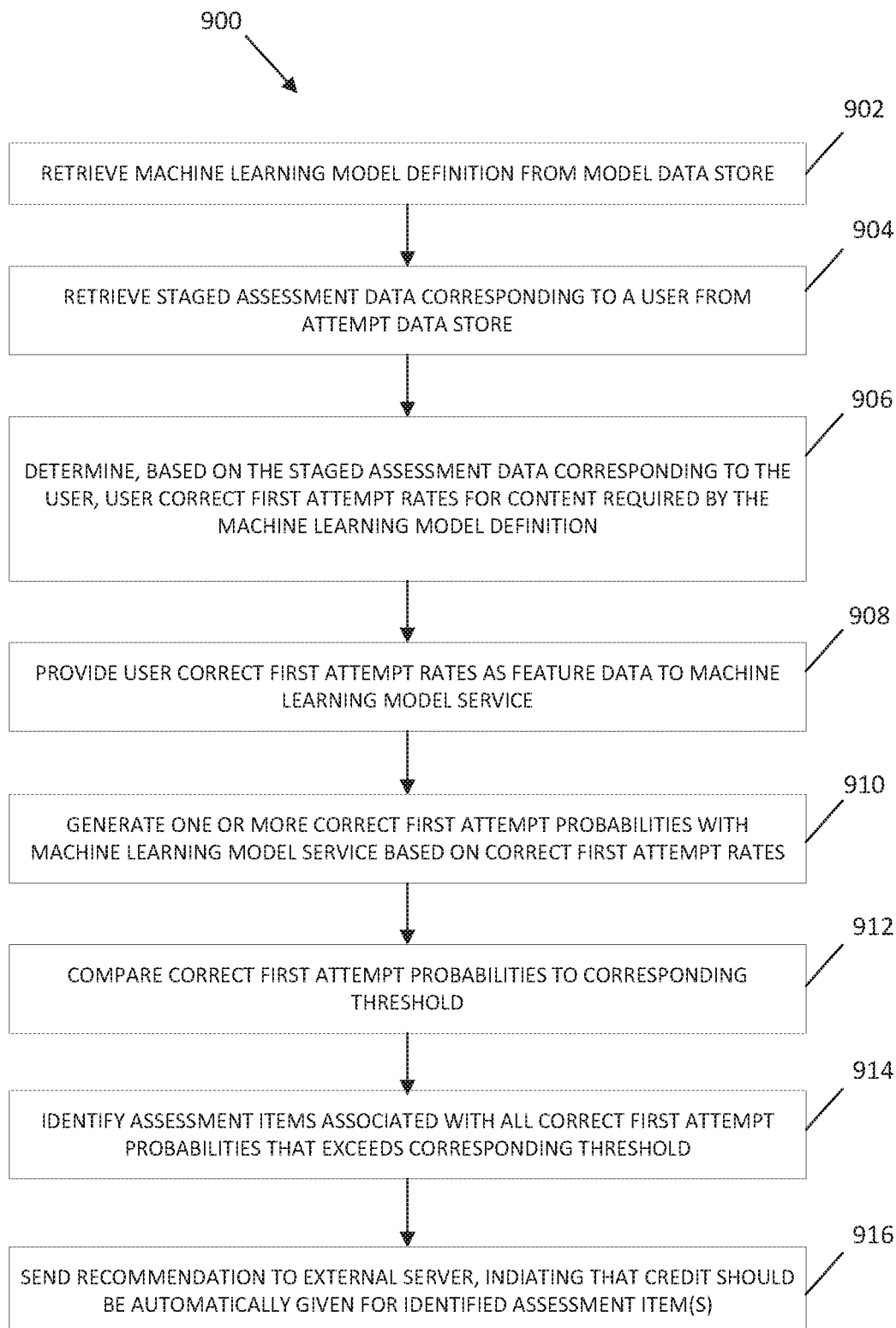
FIG. 9 illustrates a process flow diagram for a method of identifying assessment items that should be automatically marked correct in near-real-time, in accordance with an embodiment.

Turning now to FIG. 9, an illustrative method 900 is shown by which a system may determine whether to automatically provide credit to a user for selected assessment items based on user correct first attempt rates that are calculated in near-real-time according to a machine learning model definition. The method 900 may be performed by executing instructions stored in a non-transitory computer-readable memory device (e.g., of storage subsystem 210 of FIG. 2) with one or more computer processors (e.g., processors 204 of FIG. 2). The method 900 of FIG. 9 may, for example, correspond to the alternate embodiment described in connection with FIG. 4, in which the user feature analytics service 420 is omitted, and user-specific feature data is calculated in near-real-time by the feature retrieval service 408 based on staged assessment data retrieved from the attempt store 416. For example, the method 900 may be initiated in response to an ALE service (e.g., ALE service 404, FIG. 4) receiving a corresponding request from an external server (e.g., external server 402, FIG. 4) that is coupled to the server that executes the ALE service (e.g., as in step 502 of FIG. 5).

At step 902, a feature retrieval service (e.g., feature retrieval service 408, FIG. 4) retrieves a machine learning model definition corresponding to a model reference (e.g., model reference 410, FIG. 4) from a machine learning model definition data store (e.g., model definition data store 414, FIG. 4). The model reference may be generated by a model selector (e.g., model selector 407, FIG. 4) based on request data included in the request received by the ALE service. The machine learning model definition may include definitions of which feature data is required for processing by the corresponding machine learning model, definitions of how at least a portion of that feature data (e.g., user-specific feature data) is to be calculated.

At step 904, the feature retrieval service retrieves staged assessment data from an attempt data store (e.g., attempt data store 416, FIG. 4). The attempt data store may include staged assessment data corresponding to individual users and their responses to assessment items. This assessment data may be updated (e.g., in real time or near-real-time) by a user activity analytics service (e.g., user activity analytics service 418 of FIG. 4) that tracks a user's activity and records responses submitted by the user, along with other related assessment data such as the grades of responses submitted by the user. The feature retrieval service may determine which staged assessment data to retrieve based on instructions included in the machine learning model definition.

At step 906, the feature retrieval service determines, for the user, user correct first attempt rates for each piece of content, as required by the machine learning model definition. For example, for a given user, the machine learning model definition may require user correct first attempt rates for the title level and the chapter level, for the last (i.e., most recent) five assessment items completed by the user, for the last three assessment items completed by the user, and for the last assessment item completed by the user, an average amount of time taken by the user to complete the last assessment item completed by the user, an average amount of time taken by the user to complete assessment items at the title level, the chapter level, over the last five assessment items completed by the user, and/or over the last three assessment items completed by the user, an item response theory (IRT) ability/skill level of the user calculated for one or more corresponding chapters, sections, and/or titles, an average number of attempts until a correct response is submitted by the user for the title level, the chapter level, the section level, the objective level, the assessment level, and/or the assessment item level, and/or correct first attempt rates of the user on content that is defined as prerequisite for the content for which a prediction is being made. As described previously, the user correct first attempt rate for a given piece of content may be calculated as an average of the grades of all "first attempt" responses submitted to assessment items of the given piece of content. This example is meant to be illustrative and not limiting, and it should be understood that more or fewer types of feature data may be required by various machine learning model definitions At step 908, the user correct first attempt rates is provided by the feature retrieval service to a machine learning model service (e.g., of model services 406, FIG. 4) as part of a feature vector to be input to and processed by a machine learning model corresponding to the machine learning model definition, that is executed by the machine learning model service. The machine learning model service may be selected based on the machine learning model definition.

At step 910, the machine learning model service generates one or more correct first attempt probabilities based on the feature data of the feature vector that was provided by the feature retrieval service, which includes the correct first attempt rates. For example, the machine learning model service may generate a different correct first attempt probability for each assessment item being considered (e.g., with respect to whether credit should be automatically assigned for the user for those assessment items).

At step 912, a prediction evaluator (e.g., prediction evaluator 405, FIG. 4) receives the correct first attempt probability or probabilities from the machine learning model service, then compares the correct first attempt probability or probabilities to a corresponding threshold (e.g., 70%, 80%, 90%, which may be defined as a default setting by the system, or which may be adjusted/adjustable by an instructor or administrator). Based on the results of the comparison(s), the prediction evaluator identifies any correct first attempt probabilities that exceed the threshold.

At step 914, the ALE service (e.g., ALE service 404, FIG. 4) receives the results of the comparison(s) and/or the identified correct first attempt probabilities found to exceed the threshold. The ALE service then identifies the assessment items associated with each of the identified correct first attempt probabilities found to exceed the threshold.

At step 916, the ALE service sends a recommendation to an external server (e.g., external server 402, FIG. 4; which may be the same external server that sent the request that initiated the method 900). The recommendation may indicate that the identified assessment items should be automatically marked as correct (e.g., assigned credit) without requiring a response from the user. In some embodiments, the recommended automatic assignment of credit and/or the sending of the recommendation may only be carried in response to the ALE service determining that a corresponding setting (e.g., an adaptive homework setting or adaptive assessment setting) is enabled in a configuration file stored in a memory device that is in electronic communication with the processor or processors executing the method 900. The configuration file may be modified by an instructor or administrator to enable or disable the automatic assignment of credit for one or more assessments, courses, or other hierarchical levels of content.

It should be understood that method 900 may be performed in near-real-time, such that feature data generated via the method 900 may reflect user activity that has occurred within a recent time frame (e.g., within around 30 to 60 seconds of receipt of the request). In this way, the method 900 may provide recommendations for automatic credit assignment for a user that reflects recent activity of the user in addition to historical activity of the user and/or global activity of other users.

It should be understood that the automatic assignment of credit for assessment items and/or homework assignments discussed herein may be carried out in a variety of ways, but may generally be performed by updating, with one or more computer processors, a database (e.g., which may be stored in the user data server 316 and/or data store servers 304 of FIG. 3) in which user grades are stored to add or modify an entry of the database to record that a given user has received credit for a given assessment item or homework assignment.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system comprising:
a computer processor;
an electronic communication network, the computer processor being in electronic communication with an external server via the electronic communication network; and
a computer memory in electronic communication with the computer processor and configured to store computer-readable instructions which, when executed by the computer processor, cause the computer processor to:
receive, with a first service, a request from the external server, the request including a user identifier corresponding to a user, an assessment item identifier corresponding to an assessment item of a digital assessment, and request data associated with a machine learning model;
calculate a plurality of user correct first attempt rates corresponding to a first plurality of grades of a first plurality of responses previously submitted by the user based on at least one of:
a first average grade corresponding to first responses submitted by the user to a first group of assessment items corresponding to a first hierarchical content level that includes the assessment item; or
a second average grade corresponding to a predefined number of second responses most recently submitted by the user;
calculate a plurality of global correct first attempt rates corresponding to a second plurality of grades of a second plurality of responses previously submitted by a plurality of users based on:
a third average grade corresponding to third responses submitted by the plurality of users to the first group of assessment items;
a fourth average grade corresponding to fourth responses submitted by the plurality of users to a second group of assessment items corresponding to a second hierarchical content level that includes the assessment item; and
a fifth average grade corresponding to fifth responses submitted by the plurality of users to the assessment item; and
execute, with a second service, the machine learning model to process feature data to determine a correct first attempt probability for the user for the assessment item, the feature data comprising the plurality of user correct first attempt rates and the plurality of global correct first attempt rates.

2. The system of claim 1, wherein the computer-readable instructions, when executed by the computer processor, cause the computer processor to calculate the plurality of user correct first attempt rates based on the first average grade and the second average grade.

3. The system of claim 1, wherein:
the first responses and the second responses correspond to first attempts by the user; and
the third responses, the fourth responses, and the fifth responses correspond to first attempts by the plurality of users.

4. The system of claim 1, wherein the computer-readable instructions, when executed by the computer processor, cause the computer processor to determine that the correct first attempt probability exceeds a predetermined threshold.

5. The system of claim 4, wherein the computer-readable instructions, when executed by the computer processor, cause the computer processor to:
upon determining that the correct first attempt probability exceeds the predetermined threshold, send, with the first service, a recommendation to the external server indicating that credit for the assessment item should be automatically given to the user without requiring the user to submit a response to the assessment item.

6. The system of claim 5, wherein the computer-readable instructions, when executed by the computer processor, cause the computer processor to adjust the predetermined threshold based on an input received from an instructor.

7. The system of claim 1, wherein the digital assessment comprises a homework assignment and the assessment item comprises a question included in the homework assignment.

8. A system comprising:
at least one computer processor; and
at least one computer memory in electronic communication with the at least one computer processor and configured to store computer-readable instructions which, when executed by the at least one computer processor, cause the at least one computer processor to:
receive a request from an external server that is in electronic communication with the at least one computer processor, the request identifying a user and an assessment item corresponding to a digital assessment;
calculate a plurality of user correct first attempt rates corresponding to first activity of the user based on at least one of:
a first average grade corresponding to a first group of first attempt responses submitted by the user to a first group of assessment items corresponding to a first hierarchical content level that includes the assessment item; or
a second average grade corresponding to a second group of first attempt responses most recently submitted by the user, wherein the second group of first attempt responses includes a predefined number of responses;
calculate a plurality of global correct first attempt rates corresponding to second activity of a plurality of users based on:
a third average grade corresponding to a third group of first attempt responses submitted by the plurality of users to the first group of assessment items;
a fourth average grade corresponding to a fourth group of first attempt responses submitted by the plurality of users to a third group of assessment items corresponding to a second hierarchical content level that includes the assessment item; and
a fifth average grade corresponding to a fifth group of first attempt responses submitted by the plurality of users to the assessment item; and
process feature data with a machine learning model to determine a correct first attempt probability for the user for the assessment item, the feature data comprising the plurality of user correct first attempt rates and the plurality of global correct first attempt rates.

9. The system of claim 8, wherein the computer-readable instructions, when executed by the at least one computer processor, cause the at least one computer processor to calculate the plurality of user correct first attempt rates is calculated based on each of the first average grade and the second average grade.

10. The system of claim 8, wherein the computer-readable instructions, when executed by the at least one computer processor, cause the at least one computer processor to:
determine that the correct first attempt probability exceeds a predetermined threshold; and
upon determining that the correct first attempt probability exceeds the predetermined threshold, send a recommendation to the external server indicating that credit for the assessment item should be automatically given to the user without requiring the user to submit a response to the assessment item.

11. The system of claim 10, wherein the computer-readable instructions, when executed by the at least one computer processor, cause the at least one computer processor to adjust the predetermined threshold based on an input received from an instructor.

12. The system of claim 8, wherein the digital assessment comprises a homework assignment and the assessment item comprises a question included in the homework assignment.

13. A method comprising:
receiving, with at least one computer processor with a first service from an external server, a request identifying a user and an assessment item corresponding to a digital assessment;
calculating, with the at least one computer processor, a plurality of user correct first attempt rates corresponding to first activity of the user based on at least one of:
a first average grade corresponding to first responses submitted by the user to a first group of assessment items corresponding to a first hierarchical content level that includes the assessment item; or
a second average grade corresponding to a predefined number of second responses most recently submitted by the user;
calculating, with the at least one computer processor, a plurality of global correct first attempt rates corresponding to second activity of a plurality of users based on:
a third average grade corresponding to third responses submitted by the plurality of users to the first group of assessment items;
a fourth average grade corresponding to fourth responses submitted by the plurality of users to a second group of assessment items corresponding to a second hierarchical content level that includes the assessment item; and
a fifth average grade corresponding to fifth responses submitted by the plurality of users to the assessment item; and
processing, with the at least one computer processor with a second service, feature data with a machine learning model to determine a correct first attempt probability for the user for the assessment item, the feature data comprising the plurality of user correct first attempt rates and the plurality of global correct first attempt rates.

14. The method of claim 13, wherein:
the first responses and the second responses correspond to first attempts by the user; and
the third responses, the fourth responses, and the fifth responses correspond to first attempts by the plurality of users.

15. The method of claim 14, further comprising:
performing, with the at least one computer processor, a comparison between the correct first attempt probability and a predetermined threshold; and
determining, with the at least one computer processor based on the comparison, that the correct first attempt probability exceeds the predetermined threshold.

16. The method of claim 15, further comprising:
sending, with the at least one computer processor upon determining that the correct first attempt probability exceeds the predetermined threshold, a recommendation to the external server indicating that credit should be automatically given to the user for the assessment item without requiring the user to submit a response to the assessment item.

17. The method of claim 15, further comprising adjusting, with the at least one computer processor, the predetermined threshold based on an input received from an instructor.

18. The method of claim 13, wherein calculating, with the at least one computer processor, the plurality of user correct first attempt rates comprises calculating, with the at least one computer processor, the plurality of user correct first attempt rates based on the first average grade and the second average grade.

19. The method of claim 13, wherein the digital assessment comprises a homework assignment and the assessment item comprises a question included in the homework assignment.

20. The method of claim 13, wherein the digital assessment comprises a tutorial and the assessment item comprises a quiz question related to the tutorial.

* * * * *